United States Patent [19]

Sakagami et al.

[11] Patent Number: 4,799,218
[45] Date of Patent: Jan. 17, 1989

[54] NETWORK SYSTEM

[75] Inventors: Atsushi Sakagami, Yokosuka; Toru Futami, Yokohama; Noriyuki Abe, Yokosuka; Tadashi Suzuki, Yokohama, all of Japan

[73] Assignee: Nissan Motor Company, Limited, Kanagawa, Japan

[21] Appl. No.: 836,623

[22] Filed: Mar. 5, 1986

[30] Foreign Application Priority Data

Mar. 28, 1985 [JP] Japan .................. 60-62099
May 17, 1985 [JP] Japan .................. 60-103942

[51] Int. Cl.$^4$ ............................. H04J 3/02
[52] U.S. Cl. ........................ 370/85; 370/100
[58] Field of Search .............. 370/85, 100, 89; 375/107

[56] References Cited

U.S. PATENT DOCUMENTS

| 4,301,532 | 11/1981 | Janetzky | 370/85 |
| 4,484,190 | 11/1981 | Bedard | 340/825.57 |
| 4,594,705 | 6/1986 | Yahata et al. | 370/85 |
| 4,596,025 | 6/1986 | Satoh | 370/85 |
| 4,606,022 | 8/1986 | Suzuki et al. | 370/100 |
| 4,674,084 | 6/1987 | Suzuki et al. | 370/100 |

FOREIGN PATENT DOCUMENTS

| 1096403 | 12/1967 | United Kingdom . |
| 1287334 | 8/1972 | United Kingdom . |
| 1298190 | 11/1972 | United Kingdom . |
| 1427133 | 3/1976 | United Kingdom . |
| 1462052 | 1/1977 | United Kingdom . |
| 1494240 | 12/1977 | United Kingdom . |
| 2041592 | 9/1980 | United Kingdom . |

OTHER PUBLICATIONS

Ein Byteserielles Bitparalleles Schnittstellensystem fur programmierbame mebgerate-DIN IEC 625 Teil 1 Mai 1981, Wie funktioniert der IEC-Bus?-Elektronik 1975.
Microprocessor Interfacing Techniques-ZAKS; 1979 Sybex Inc.; pp. 93-109.

Primary Examiner—Douglas W. Olms
Assistant Examiner—Frank M. Scutch, III
Attorney, Agent, or Firm—Lowe, Price, LeBlanc, Becker & Shur

[57] ABSTRACT

A time-division multiplex transmission network system having a plurality of data processing stations, in which data of a predetermined number of bits is transmitted on a data transmission line for a period of time determined by the number of bits of data by one bit in synchronization with a synchronization signal extracted from a predetermined time series code string signal when one of code patterns derived from the predetermined time series code string signal coincides with a predetermined code pattern indicating an address allocated to one of the individual data stations.

14 Claims, 5 Drawing Sheets

FIG. 1
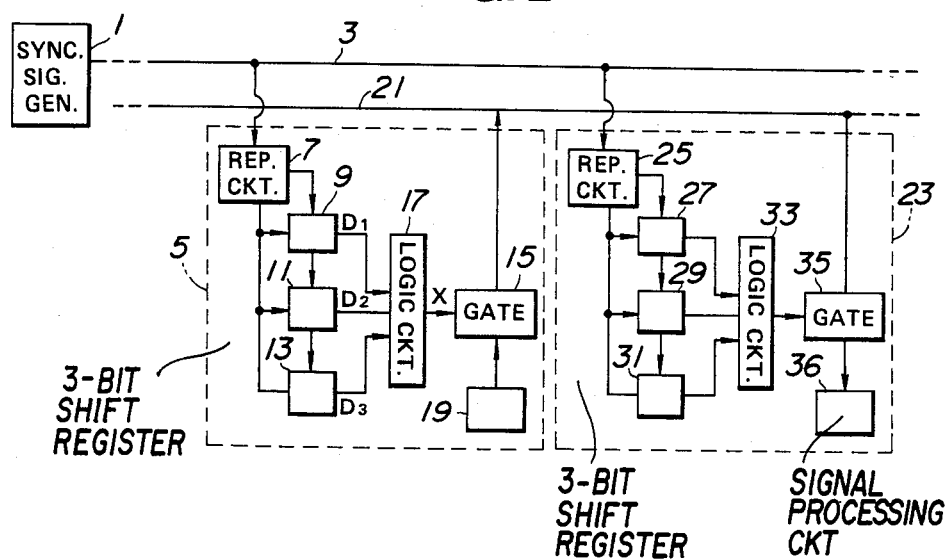
FIG. 2(a) (PRIOR ART)
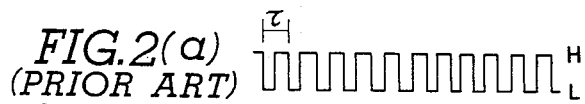
FIG. 2(b) (PRIOR ART)
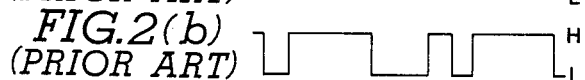
FIG. 2(c) (PRIOR ART)
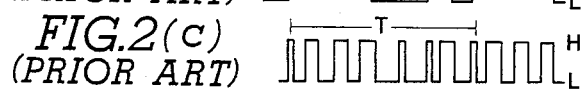
FIG. 3 (PRIOR ART)
|     | (6) | (7) | 1 | 2 | 3 | 4 | 5 | 6 | 7 | (1) |
|-----|-----|-----|---|---|---|---|---|---|---|-----|
| $D_1$ | H | H | H | L | L | H | L | H | H | H |
| $D_2$ | L | H | H | H | L | L | H | L | H | H |
| $D_3$ | H | L | H | H | H | L | L | H | L | H |
| X   | L | H | L | L | L | L | L | L | H | L |

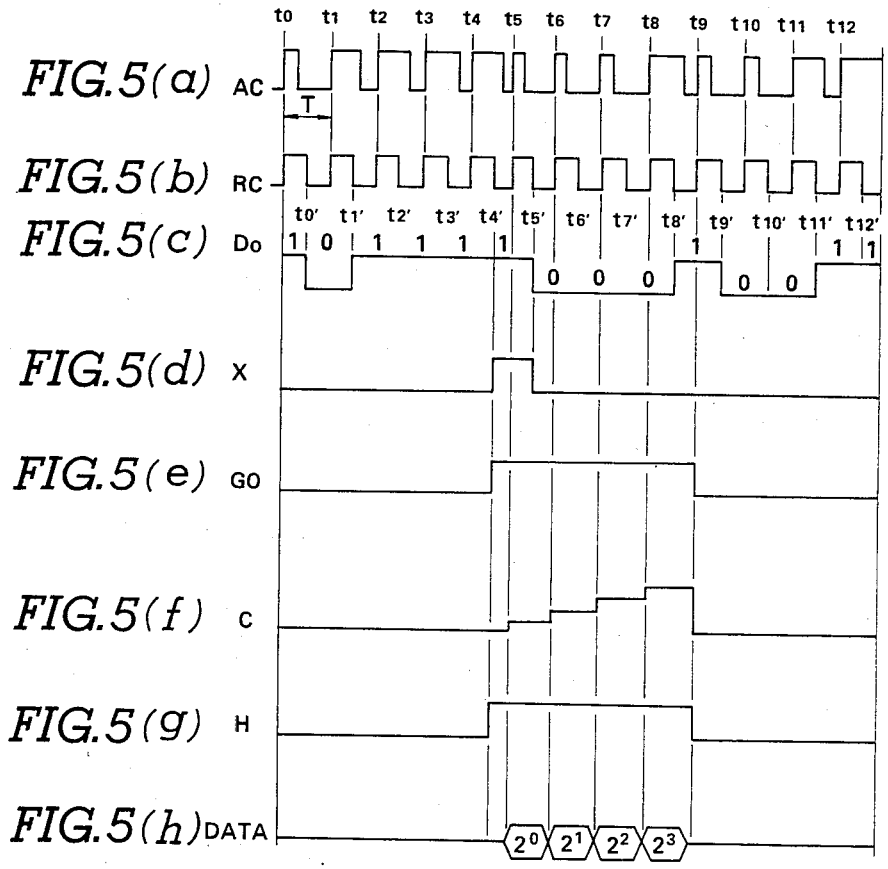

NETWORK SYSTEM

BACKGROUND OF THE INVENTION

1. Field of the Invention

The present invention relates to a time-division multiplex transmission network system in which data of a predetermined number of bits can be transmitted and received between at least one data transmitter and at least one data receiver constituting the network system, with a high reliability and with a high efficiency.

2. Description of the Prior Art

Conventional network systems are exemplified by a Japanese Patent Application Examined Open No. Sho 52-13367.

FIGS. 1, 2, and 3 show the network system disclosed in the above-identified Japanese Patent Application publication.

A synchronization signal generator 1 generates a clock signal having a constant period $\tau$ as shown in FIG. 2(a) and a third-order M-series code string repeating such an order as H, H, H, L, L, H, and H for each constant period T as shown in FIG. 2(b), modulates the M-series code in a pulse width modulation mode, and sends the modulated code signal to an address clock transmission line 3.

A data transmitter 5 comprises: a reception circuit 7 which receives the modulated code signal via the address clock transmission line 3 and demodulates it into the synchronization signal shown in FIG. 2(a) and code string signal shown in FIG. 2(b); a three-bit shift register 9, 11, and 13 which sequentially shifts the demodulated code string signal in synchronization with the demodulated synchronization signal; and a logic circuit 17 which opens a gate 15 when a logic operation of each output stage of the above-described shift register 9, 11, and 13 is carried out and when the logic operation results in a predetermined logic.

FIG. 3 shows each output signal state D1, D2, and D3 of the three-bit shift register 9, 11, and 13 and output signal state X of the logic circuit 17 for each synchronization signal. As shown in FIG. 3, seven combination patterns of the output signal levels "L" and "H" appear during the period T of the code string signal.

Hence, if one of the seven kinds of combination patterns in each data transmitter 5, e.g., H, H, L shown in FIG. 3 is an established condition of the logic circuit 17, the logic condition of the logic circuit 17 is established only once during the interval T of the above-described code string signal so that the gate 15 is opened and one bit data is sent from an input circuit 19 to a data transmission line 21.

Similarly, the data receiver 23 comprises: a reception circuit 25; a three-bit shift register 27, 29, and 31; and a logic circuit 33. When a predetermined combination pattern is produced during one period T of the above-described code string signal, the gate 35 is opened so that the data is fetched from the data transmission line 21 and a signal processing circuit 36 carries out a predetermined processing. In this way, mutual data transmission and reception is established between the transmitter 5 and receiver 23.

However, since in the conventional network system one bit of data is transmitted in synchronization with the synchronization signal with the respective gates 15, 35 opened when a predetermined address allocated to each of data transmitter and corresponding receiver appears, only one bit of information, e.g., on-and-off information is transmitted whenever the logic condition is established.

Since in the one-bit transmission method a parity bit cannot be added to the information, a reliability of data transmission in the network system is reduced.

In addition, if data comprising a plurality of bits are transmitted and received between a pair of data transmitter and receiver in the conventional network system, a plurality of addresses need to be allocated to each of the data transmitter and receiver or a single data need to be divided into a series of one-bit data and transmitted a plural number of times by one bit. Consequently, the combinations of the pair of data transmitter and receiver become complex and transmission time required for the whole data becomes longer.

SUMMARY OF THE INVENTION

With the above-described problems in mind, it is an object of the present invention to provide a network system which can smoothly transmit a single or plurality bits of information without complication of each construction of data transmitter and receiver and without requiring a long transmission time of such information.

This can be achieved by providing a network system which comprises: (a) first means for generating and transmitting a periodic predetermined time series code string signal in synchronization with a synchronization signal generated thereby having a predetermined period, (b) second means for receiving said periodic predetermined time series code string signal from said first means and for detecting whether one of code patterns derived from the received predetermined time series code string signal coincides with a predetermined code pattern indicating an address of one data station and outputting a first signal indicating that said code pattern accords with said predetermined code pattern, and (c) third means for carrying out at least one of transmission and reception of a data of a predetermined number of bits for a period of time determined by said predetermined number of bits of data via a data transmission line to which others of the third means are connected each by one bit in synchronization with the synchronization signal derived from said first means when said second means outputs said first signal.

BRIEF DESCRIPTION OF THE DRAWINGS

A more complete understanding of the present invention may be obtained from the following detailed description taken in conjunction with the attached drawings, in which like reference numerals designate corresponding elements, and in which:

FIG. 1 is a circuit block diagram of a conventional network system disclosed in a Japanese Patent Application Examined Open No. Sho 52-13367;

FIGS. 2(a) through 2(c) are timing charts of a clock signal, M-series code signal, and a pulse-width modulated M-series code signal generated in a synchronization signal generator 1 shown in FIG. 1;

FIG. 3 is an explanatory view of a relationship between the contents of each output stage of a three-bit shift register 9, 11, 13 and 27, 28, 31 and output signal X of each logic circuit 17, 33 shown in FIG. 1;

FIGS. 5(a) through 5(h) are timing charts of internal circuits of the data transmitter shown in FIG. 7;

DETAILED DESCRIPTION OF THE PREFERRED EMBODIMENTS

Reference will hereinafter be made to the drawings in order to facilitate understanding of the present invention.

Figure 4:
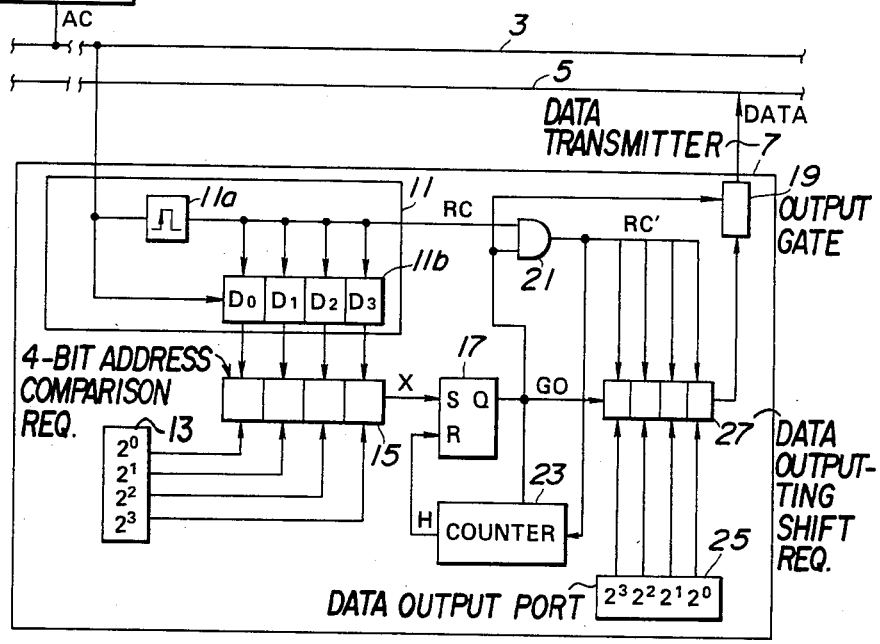
FIG. 4 is a circuit block diagram of a data transmitter used in a first preferred embodiment of the network system according to the present invention.
Figure 6:
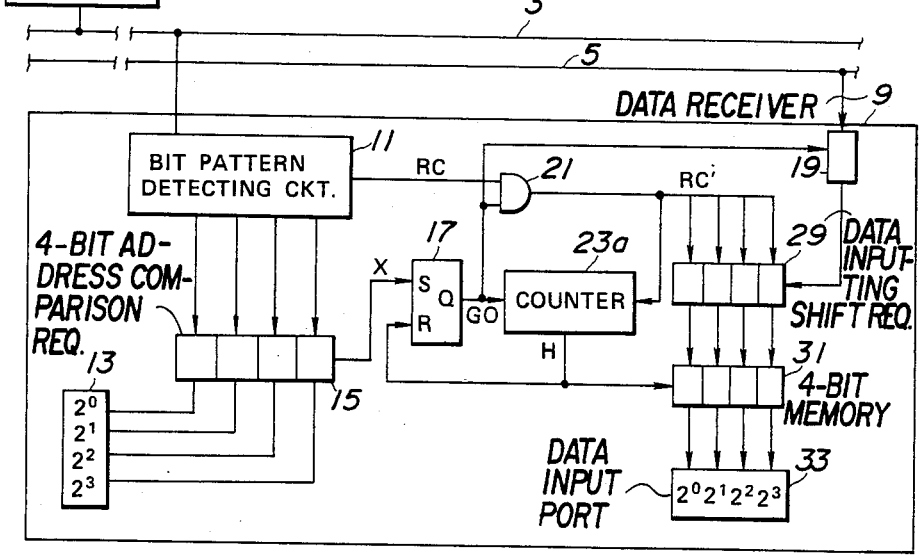
FIG. 6 is a circuit block diagram of a data receiver in the first preferred embodiment.

FIG. 4 shows a data transmitter in a first preferred embodiment of the time-shared multiplex transmission network system. FIG. 6 shows a data receiver in the first preferred embodiment. FIGS. 5(a) through 5(h) show timing charts indicating signal states of respective internal circuits of the data transmitter and data receiver shown in FIGS. 4 and 6.

Although an address clock generator 1 shown in FIGS. 4 and 6 is similar to the synchronization signal generator 1 described in the conventional network system with reference to FIG. 1, a fourth-order M-series code string signal is in this case generated in the address clock generator 1 which is different in a period and combination of bits from the third-order M-series code string shown in FIG. 3. It should, however, be noted that the synchronization signal is the same as that shown in FIG. 2(a). In addition, it should be noted that a maximum period among a bit string comprising $(2^n - 1)$ number of bits is called an M-series sequence. On the other hand, although the number of combination patterns which can be obtained from a string of bits of the number n is $2^n$, n-bit string having the number of $(2^n - 1)$ excepting all bits being zeroes can be obtained as a predetermined continuous bit string in the M-series sequence. Furthermore, such a M-series code string can be achieved by the combination of a multi-bit shift register whose the number of bit stages corresponds to the number (n) of order and Exclusive OR gate circuit. An address clock signal AC shown in FIG. 5(a) is sent from the address clock generator 1 into an address clock transmission line 3. A plurality of data transmitters and receivers, each having its own predetermined address are connected to the address clock transmission line 3 and to the data transmission line 5 so that a predetermined data transfer is made between one of the transmitters and one of or a plurality of the receivers or between one of the data receivers and a plurality of transmitters, these having the corresponding predetermined addresses.

The data transmitter 7 comprises an address reproduction circuit 11 connected to the address clock transmission line 3, as shown in FIG. 4. The address reproduction circuit 11 comprises: a one-shot multivibrator 11a synchronizing a rising edge of its input signal; and a four-bit shift register 11b. The address reproduction circuit 11 reproduces the synchronization signal and an address determination signal sequentially from the address clock signal AC on the address clock transmission line 3. That is to say, the address clock signal AC shown in FIG. 5(a) is inputted into the one-shot multivibrator 11a to reproduce the synchronization pulse train signal RC shown in FIG. 5(b). On the other hand, the four-bit shift register 11b receives the address clock signal AC from a first bit stage Do thereof and latches the signal AC on each falling edge of the synchronization signal RS to produce a signal Do at the first bit stage thereof as shown in FIG. 5(c). It should be noted that the remaining bit stages thereof appear the signal immediately before the previous bit stage. The produced signal is such an array as 01111 ... in a time shared mode if the low level is defined as a logic 0 and high level is defined as 1.

The shift register 11b sequentially shifts the code string appearing on the first bit stage Do to the subsequent bit stages D1, D2, and D3 in synchronization with (each falling edge of) the synchronization signal RC so that the four-bit shift register 45 holds such bit patterns as 0111, 1111, 1110, ... whenever a high level stage of the synchronization pulse train signal S falls. The data transmitter 7 further comprises a four-bit address comparator 15 connected to the four-bit shift register 11b. If one of the bit patterns appearing on the parallel output terminals of the shift register 11b reaches a predetermined value, e.g., 0111, the comparator 15 determines that the current bit pattern accords with a predetermined address code allocated to the data transmitter itself and then outputs a high-level signal X shown in FIG. 5(d). Consequently, it is determined as a timing at which the data transmitter 7 starts data transmission. In this embodiment, an address set circuit 13 is provided for arbitrarily changing a set value of the address comparator 15.

The above-described signal X is sent to a set terminal S of an R/S (Reset/Set) flip-flop circuit 17 and a high-level signal GO is outputted as shown in FIG. 5(e) from an output terminal Q of the flip-flop circuit 17 until the level at a reset terminal R thereof is turned to a low level. On the other hand, an AND gate 21 receives the synchronization pulse train signal RC and output signal GO from the output terminal Q of the flip-flop circuit 17. While the signal GO is at a high level, a synchronization signal RC' is outputted via the AND gate 21 during the high level of the signal GO. A counter 23 is installed between the output terminal Q of the flip-flop circuit 17 and reset terminal R thereof and outputs a high-level signal H as shown in FIG. 5(g) to the reset terminal R of the flip-flop circuit 51 at the same time when the signal X is turned to a high level. While the above-described signal GO is at a high level, the counter 17 counts the number of pulses in the synchronization signal RC' outputted from the AND gate 21. When the count value of the counter 23 reaches a predetermined value, e.g., 4, the output signal H is turned to a low level upon a rising edge of the subsequent incoming synchronization signal RC' via the AND gate 21. Consequently, the output signal GO of the flip-flop circuit 17 is turned to a low level.

The data transmitter 7 further comprises an output gate 19 which receives the above-described signal GO derived from the flip-flop circuit 17 and the gate of which is opened in response to the high-level signal GO.

A data outputting shift register 27 connected to the flip-flop circuit 17 latches a four-bit input information inputted from an encoder (data output port) 25 in synchronization with each rising edge of the signal RC' and outputs a four-bit data in serial mode lached in the shift register 27 as shown in FIG. 5(h) to the data transmission line 5 sequentially via the output gate 19 in synchronization with the synchronization signal RC' via the AND gate 21. Since as shown in FIG. 5(h) the output signal H of the counter 23 is turned to a low level at the next rising edge of the synchronization signal RC' when the four-bit data has outputted to the data transmission line 5, the output signal GO of the flip-flop circuit 17 is turned to a low level (reset) and the flip-flop circuit 17 is enabled to wait for the next high-level signal X.

In this way, the data transmitter 7 transmits the four-bit information to the data transmission line 5 in synchronization with the synchronization signal RC' via the AND gate 21 when a predetermined code string signal, e.g., 0111 appears on the address clock transmission line 3 at a start point of a rising edge (time t5) of the subsequently incoming synchronization signal RC' (, i.e., RC).

It should be noted that a parity bit can be included in the four-bit information described above in order to make a highly reliable transmission of data on the data transmission line 5.

Next, the construction of one data receiver 9 will be described below with reference to FIG. 6.

The data receiver 9 comprises: a bit pattern detection circuit 11 (including rising edge responsive one-shot multivibrator 11a); a shift register 11b; an address comparator 15; an address set circuit 15; a Reset/Set flip-flop circuit 17; and AND gate 21. These circuits have the same functions as those denoted by the same reference numerals in the data transmitter 7 shown in FIG. 4. It should be noted that for explanation purposes the data receiver 9 shown in FIG. 6 has previously set the same address as that of the transmitter 7 shown in FIG. 4. It should also be noted that the signals AC, RC, X, GO, H, RC' and C shown in FIG. 6 are the same as those shown in FIGS. 5(a) through 5(h).

The data receiver 9 further comprises a counter 23a; an input gate 19; a data inputting shift register 29; a memory 31; and a signal processing circuit (data input port) 33.

Although the counter 23a has the same function as the counter 23 shown in FIG. 4, the output terminal of the counter 23a is not only connected to a reset terminal R of the flip-flop circuit 17 but also to the four-bit memory 31. The input gate 19 opens its gate as long as the output signal GO of the flip-flop circuit 17 remains at a high level in the same way as the output gate 19 of the transmitter 7 shown in FIG. 4.

The data inputting shift register 29 receives serial data from the data transmission line 5 via the gate 19 and fetches the four-bit information outputted from the corresponding data transmitter 7 at each falling edge of the signal RC' on the basis of the synchronization signal RC.

The four-bit memory 31 latches the contents of the shift register 29 on the falling edge of the signal H shown in FIG. 5(g) which resets the flip-flop circuit 17 and increments the count number of the four-bit counter 23a and sends the latched data to the signal processing circuit (data input port) 33. The signal processing circuit (data input port) 33 has a parity check function and is formed, e.g., as a signal processing section of a microcomputer or a control signal processing section which processes directly a predetermined load.

In this way, the data receiver 9 decodes the address clock signal AC generated from the address clock generator 1 into the synchronization signal RC and code string signal in the same way as the data transmitter 7, stores the data appearing on the data transmission line 5 via the input gate 19, shifts it into the memory 31, and sends it into the signal processing circuit (data input port) 33. The synchronization method therefor is already described with reference to FIGS. 5(a) through 5(h). The signal processing circuit (data input port) 33 processes in such a way that the predetermined load carries out the predetermined operation on the basis of received data.

When the predetermined address set in both data transmitter 7 and receiver 8 appears, the plurality of bits of information can be transmitted in units of one bit in synchronization with each synchronization signal. Consequently, data transmission is quickly carried out and the reliability of data transmission can be improved due to the addition of the parity bit.

Although the data transmission is carried out between one of the data transmitters and one of the data receivers as described above on the first embodiment, the data transmission can also be carried out between one of the data transmitters and a predetermined number of the data receivers. In addition, although the data is defined as the four-bit information in the above description, the data may alternatively be defined as a single bit or a plurality of bits of information excepting the four bits. In the first embodiment, data transmitters and receivers which can transmit and receive one-bit data as in the conventional network system may be combined with the data transmitters and receivers used in the first embodiment. Furthermore, although in the first embodiment described above the network system is provided with respectively separated data transmitters and data receivers, such a network system may be achieved in which one data transmitter and one data receiver are integrally mounted in a single unit so that a suitable switching between the transmission and reception is made to function as the data transmitter and as the data receiver.

In the embodiment described above shown in FIG. 4 through FIG. 6, on the basis of the gate open signal determined by the counters of the transmitter and receiver 23, 23a, the data transmitter and receiver 7, 9 opens its own gate and transmits and receives the data at its own predetermined timings. It is noted that although the receiver 9 in this embodiment is described as the example of receiving the first bit of the four-bit data transmitted from the transmitter 7, the receiving capability of the receiver 9 can be changed in such a way that if a predetermined address is set and predetermined count number is set in the counter 23, the receiver 9 continuously receives the one bit from the transmitter 7 and receives one bit from another transmitter sequentially. In addition, the data receiver may alternatively receive a suitable number of bits from the above-described transmitter 7 shown in FIG. 4, receive continuously one bit in addition to the received number of bits from the other transmitter, and processes the totally received data appropriately to control the plurality of loads in the predetermined mode.

Figure 7:
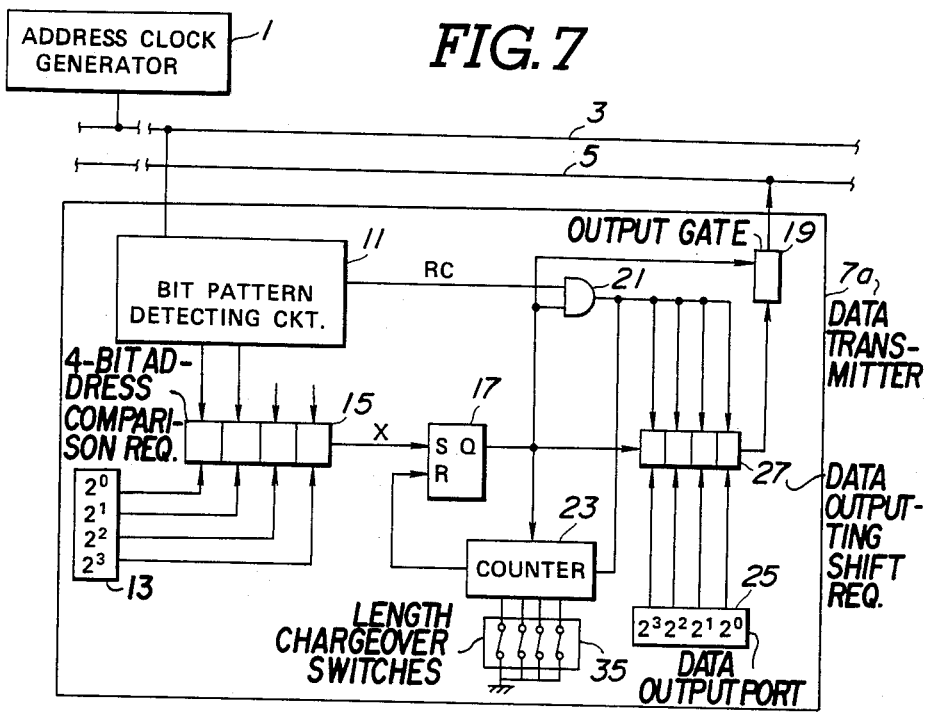
FIG. 7 is a circuit block diagram of a data transmitter in a second preferred embodiment.
Figure 8:
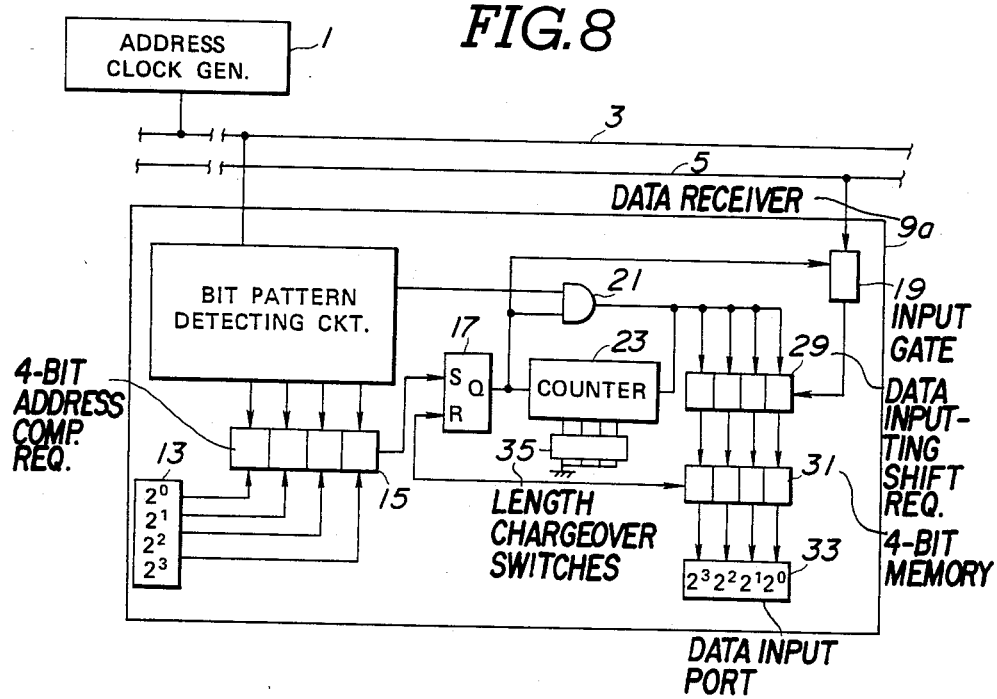
FIG. 8 is a circuit block diagram of a data receiver in the second preferred embodiment.

FIGS. 7 and 8 show data transmitter 7a and data receiver 9a used in the second embodiment, respectively.

In the second embodiment, counters 23 of the respective data transmitter and receiver are furthermore connected with data length changeover switches 35, respectively.

The data transmitter 7a and receiver 9a shown in this embodiment can change the maximum count number of the respective counters 23 according to the number of data bits (data length) in their usage locations so that the common usability (general-purpose) data transmitter and receiver can be achieved.

Next, the application example of the present invention will be described with reference to FIG. 9 and FIG. 10.

Figure 9:
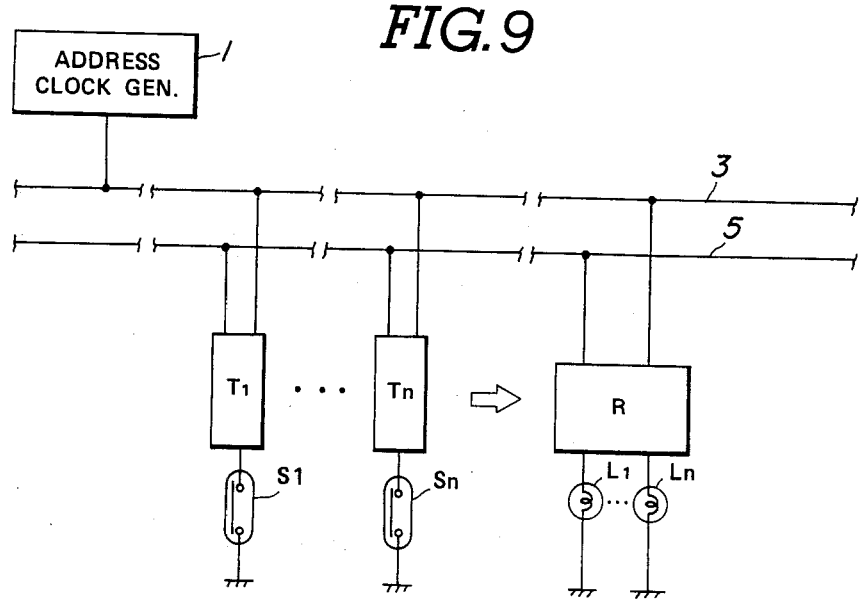
FIGS. 9 and 10 are explanatory views for illustrating respective examples of applications of the data transmitters and receivers used in the second preferred embodiment.
Figure 10:
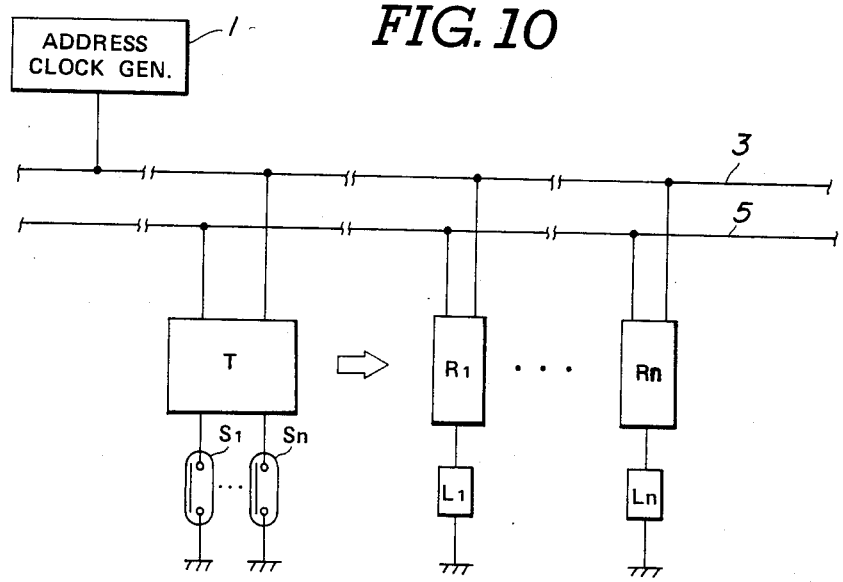

In FIGS. 9 and 10, T, $T_1$, $T_2$, ..., $T_n$ denote data transmitters and R, $R_1$, $R_2$, ... $R_n$ denote data receivers, $S_1$, ..., $S_n$ denote switches, $L_1$, ..., $L_n$ denote loads corresponding to the respective switches $S_1$, ..., $S_n$.

The application example shown in FIG. 9 is warning indicators of a vehicle in which data transmitters $T_1$ ... $T_n$ are attached to respective switches $S_1$ ... $S_n$ such as a door switch, oil pressure switch, battery liquid amount switch, and so on. The data sent from these transmitters $T_1$ ... $T_n$ is received as a single data from one receiver R and illuminates the indicators $L_1$ ... $L_n$ on the instrument panel.

In this application example, the counters 23, 23a of the data transmitters shown in either FIG. 4 or FIG. 8 may be preset to one ("1") as to maximum count number and the counter of the data receiver 9 may be set to the maximum count number of n. In this case, the address code i is set to the transmitter $T_1$ and receiver R and the subsequent addresses in the four-order M-series code string signal are sequentially set in the other data transmitters.

On the other hand, the application example shown in FIG. 10 is an example in which power loads (such loads as requiring actuations by means of motors or external forces) such as cluster switches are dispersed. A single data transmitter T is installed corresponding to the concentrated switch group on the instrument panel of the vehicle and a plurality of data receivers $R_1$ ... $R_n$ are installed on the dispersed loads such as a rear windshield defogger, trunk opener, fuel lid, power antenna, and so on.

In this example, the counter of the data transmitter T is preset to the maximum count number n and each counter of the data receivers $R_1$ ... $R_n$ is set to one ("1") as the maximum count number. In addition, the address code of i is set in the data transmitter T and receiver $R_1$ and the subsequent counters address codes in the four-order M-series code signal are sequentially set in the remaining data receivers $R_2$ ... $R_n$. The data having the number of bits of n transmitted from the data transmitter T are sequentially fetched by one bit into the respective data receivers $R_1$ ... $R_n$ so that each load carries out a predetermined operation.

Although in the above-described examples, the numbers of data transmitters and data receivers correspond to 1 to n, the correspondence of the numbers can be set differently according to the concentration of switches or loads if the address setting is appropriately made.

As described hereinabove, since in the network system according to the present invention the data having the predetermined number of bits is transmitted and received between at least one data transmitter and at least one data receiver sequentially by one bit in synchronization with the synchronization pulse train signal demodulated from the address clock signal when the set address code is received at the data transmitter and receiver, the data transmission on the data transmission line can quickly be carried out with a high reliability of data.

In addition, since in the network system of the second preferred embodiment the open duration of the data outputting and receiving gate circuits is controlled according to the number of data bits and the data of the predetermined number of bits is transmitted within a time slot determined according to the length of data, the data of the predetermined number of bits can be produced according to the concentration of the data supply portion such as switches and can be received according to the concentration of the data application portion such as loads so that the system efficiency can be increased. Furthermore, the open duration described above is controlled by means of counters installed in the data transmitter and receiver. If the maximum count number of the counters is changeable according to the data length, the data transmitter and receiver having the mutually same construction can be assembled. Consequently, a highly general purpose network system can be achieved.

It will clearly be understood by those skilled in the art that the foregoing description is made in terms of the preferred embodiments and various changes and modifications may be made without departing from the scope of the present invention which is to be defined by the appended claims.

What is claimed is:

1. A network system, comprising:
   (a) first means for generating and transmitting a periodic predetermined time series code string signal in synchronization with a synchronization signal generated thereby having a predetermined period;
   (b) second means for receiving said periodic predetermined time series code string signal from said first means via an address clock line and for detecting whether one of a plurality of code patterns derived from the received predetermined time series code string signal coincides with a predetermined code pattern indicating an address of one data station and outputting a first signal indicating that said code pattern accords with said predetermined code pattern; and
   (c) third means for carrying out at least one of transmission and reception of data constituted by a plurality of serial bits for a period of time determined by said number of bits constituting the data via a data transmission line to which others of said third means are connected, each bit of the data on the data transmission line being continuously transmitted until the end of the data transmission, a period of each bit being equal to the predetermined period in synchronization with the synchronization signal derived from said first means when said second means outputs said first signal.

2. A network system, comprising:
   (a) first means for generating and transmitting a periodic predetermined time series code string signal in synchronization with a synchronization signal generated thereby and having a predetermined period;
   (b) second means for receiving said periodic predetermined time series code string signal from said first means via a control signal line and for detecting whether one of code patterns derived from the received predetermined time series code string signal coincides with a predetermined code pattern indicating an address of one data station and outputting a first signal indicating that said code pattern accords with said predetermined code pattern; and (c) third means for carrying out at least one of transmission and reception of a data having a predetermined number of bits to and from at least one of other third means for a period of time determined by said predetermined number of bits of data via a data transmission line to which others of said third means are connected each by one bit in synchronization with the synchronization signal derived from said first means when said second means outputs said first signal;
wherein said second means comprises: (1) a one-shot multivibrator which receives the predetermined time series code string signal from said first means and outputs a second signal having a reference period in synchronization with each rising edge of the predetermined time series code string signal; (2) a multi-bit shift register which receives the predetermined time series code string signal and outputs sequentially a third signal corresponding to one code pattern in parallel in synchronization with said second signal from said one-shot multivibrator; and (3) an address coincidence circuit which receives the third signal from said shift register, compares the code pattern indicated by the third signal with the predetermined code pattern indicating the address allocated to the data station, and outputs the first signal when they coincide with each other.

3. The network system according to claim 2, wherein said third means comprises: (a) flip-flop circuit which outputs a fourth signal when the first signal is received from said address coincidence circuit; (b) an AND gate which takes a logical product between the second signal from said one-shot multivibrator and the fourth signal from said flip-flop circuit; (c) a counter which counts the number of pulses of the second signal during receipt of said fourth signal from said flip-flop circuit and outputs a fifth signal to said flip-flop circuit for resetting said flip-flop circuit when the count number reaches a predetermined number so that a time duration of the fourth signal corresponds to a time duration until the counter counts the predetermined number; and (d) a gate which receives the fourth signal from said flip-flop circuit and opens its gate so as to enable at least one of data transmission and reception during the time duration of the fourth signal.

4. The network system according to claim 3, wherein said third means further comprises another multi-bit shift register which converts data of the predetermined number of bits in parallel to the corresponding serial bit data and outputs the serial bit data to said gate in synchronization with the second signal received from said one-shot multivibrator via said AND gate.

5. The network system according to claim 3, wherein said third means further comprises: another multi-bit shift register which converts data of the predetermined number of bits in serial to the corresponding data in the parallel form and outputs the data in the parallel form to a memory for temporarily storing the data in the parallel form until the fifth signal of said counter is received in synchronization with each falling edge of the second signal received from said one-shot multivibrator via said AND gate.

6. The network system according to claim 2, wherein the reference period of the second signal is substantially equal to the synchronization signal generated by said first means.

7. The network system according to claim 3, wherein said third means further comprises a changeover switch for switching the predetermined number to which said counter counts the number of pulses of the second signal received from said one-shot multivibrator via said AND gate according to the number of bits of data and the time duration of said gate is changed according to the predetermined count number of said counter.

8. A network system having a plurality of interconnected data processing stations, comprising:
(a) first means for generating and transmitting a periodic predetermined time series code string signal to a first line in synchronization with a synchronization signal generated thereby having a predetermined period;
(b) a plurality of data transmitters, each transmitter including,
(c) second means for receiving said periodic predetermined time series code string signal from said first line and for detecting whether one of a plurality of code patterns derived from the received predetermined series code string signal coincides with a predetermined code pattern indicating an address allocated to the data transmitter and outputting a signal indicating that the derived code pattern coincides with the predetermined code pattern, and
(d) third means for transmitting data of at least one bit in synchronization with the synchronization signal of said first means when said second means outputs the signal; and
(e) a data receiver, connected with the plurality of data transmitters via a second line, including
(f) fourth means for receiving data having a plurality of bits, the number of data bits corresponding to the number of data transmitters, from said plurality of data transmitters via said second line in synchronization with the synchronization signal derived from said first means.

9. The network system according to claim 8, wherein each data transmitter transmits one bit data indicating an on or off state of a switch.

10. The network system according to claim 9, wherein said data receiver is connected to a plurality of loads, each load associated with the corresponding switch connected to one of said data transmitters and actuated depending on the corresponding switch state.

11. A network system having a plurality of interconnected data processing stations, comprising:
(a) first means for generating and transmitting a periodic predetermined time series code string signal to a first line in synchronization with a synchronization signal generated thereby having a predetermined period;
(b) a plurality of data receivers, each receiver including,
(c) second means for receiving said periodic predetermined time series code string signal from said first line and for detecting whether one of a plurality of code patterns derived from the received predetermined series code string signal coincides with a predetermined code pattern indicating an address allocated to the data receiver and outputting a signal indicating that the derived code pattern coincides with the predetermined code pattern, and
(d) third means for receiving data of at least one bit in synchronization with the synchronization signal of said first means when the output of said second means is received; and (e) a data transmitter, connected with the plurality of data receivers via a second line, including
(f) fourth means for transmitting data having a plurality of bits, the number of data bits corresponding to the number of data receivers, to said plurality of data receivers via said second line in synchronization with the synchronization signal derived from said first means.

12. The network system according to claim 11, wherein each of said data receivers is connected to a load and said transmitter is connected to a plurality of switches and transmits an information of on or off state of each siwtch to each data receiver so that the corresponding load is actuated depending on the switch information.

13. A network system, comprising:
(a) first means for generating and transmitting a periodic predetermined time series code string signal in synchronization with a synchronization signal generated thereby and having a predetermined period;
(b) second means for receiving said periodic predetermined timer series code string signal from said first means via a control signal line and for detecting whether one of a plurality of code patterns derived from the received predetermined time series code string signal coincides with a predetermined code pattern indicating an address of one data station and outputting a first signal indicating that said code pattern accords with said predetermined code pattern; and
(c) third means for carrying out at least one of transmission and reception of data constituted by a plurality of serial bits to and from at least one of other third means for a period of time determined by said number of bits constituting the data via a data transmission line to which others of said third means are connected, each bit of the data on the data transmission line being continuously transmitted until the end of the data transmission, a period of each bit being equal to the predetermined period in synchronization with the synchronization signal derived from said first means when said second means outputs said first signal.

14. The network system according to claim 13 wherein the predetermined time series code is a fourth order M series sequence.

* * * * *